US012783181B2

(12) United States Patent
Takayama

(10) Patent No.: US 12,783,181 B2
(45) Date of Patent: Nov. 3, 2026

(54) INFORMATION PROCESSING SYSTEM, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Hiroyuki Takayama, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/366,691

(22) Filed: Aug. 8, 2023

(65) Prior Publication Data

US 2024/0319927 A1 Sep. 26, 2024

(30) Foreign Application Priority Data

Mar. 24, 2023 (JP) ................................ 2023-049078

(51) Int. Cl.
*G06F 3/12* (2006.01)

(52) U.S. Cl.
CPC .......... *G06F 3/1204* (2013.01); *G06F 3/1229* (2013.01)

(58) Field of Classification Search
CPC ............................ G06F 3/1204; G06F 3/1229
See application file for complete search history.

(56) References Cited

U.S. PATENT DOCUMENTS

| | | | | | |
|---|---|---|---|---|---|
| 9,998,612 | B2 * | 6/2018 | Han | ...................... | G06F 3/1285 |
| 10,809,993 | B2 | 10/2020 | Igarashi | | |
| 2017/0187890 | A1 * | 6/2017 | Han | .................. | H04N 1/00037 |
| 2021/0026582 | A1 * | 1/2021 | Mochizuki | ......... | H04N 1/32545 |
| 2024/0314247 | A1 * | 9/2024 | Funaki | .............. | H04N 1/00074 |

FOREIGN PATENT DOCUMENTS

| | | |
|---|---|---|
| JP | 2017156953 | 9/2017 |
| JP | 6905111 | 7/2021 |

* cited by examiner

*Primary Examiner* — Zhipeng Wang
(74) *Attorney, Agent, or Firm* — JCIPRNET

(57) ABSTRACT

An information processing system includes a processor configured to: acquire prepared setting information, which is information on settings that is prepared in advance in an environment different from an actual environment and can be reflected in a management device that manages a device to be managed; acquire environmental setting information, which is information set in the device to be managed in the actual environment in which the device to be managed is actually installed; and update information on a setting item that depends on the actual environment in the prepared setting information by the environmental setting information and reflect the updated prepared setting information in settings of the management device.

10 Claims, 15 Drawing Sheets

FIG. 5A

“Printer”:{}
“PrinterGroup”:{},
“RestrictColorPrint”:{}
“User”:{1:”userA”, 2:”userB”}
“Mobile”:{1:”mobileA”, 2:”mobileB”, 3:”mobileC”}

FIG. 5B

“Printer”:{1:”10.85.67.1”, 2:”10.85.67.2”,
3:”10.85.67.3”}
“PrinterGroup”:{},
“RestrictColorPrint”:{”1,2”}
“User”:{1:”userA”, 2:”userB”}
“Mobile”:{1:”mobileA”, 2:”mobileB”, 3:”mobileC”}

FIG. 5C

“Printer”:{1:”10.85.67.1”, 2:”10.85.67.2”,
3:”10.85.67.3”}
“PrinterGroup”:{1:”1,2”,2:”3”},
“RestrictColorPrint”:{”1,2”}
“User”:{1:”userA”, 2:”userB”}
“Mobile”:{1:”mobileA”, 2:”mobileB”, 3:”mobileC”}

FIG. 6A

"Printer":{1:"10.85.67.1", 2:"10.85.67.2", 3:"10.85.67.3"}
"PrinterGroup":{1:"1,2",2:"3"},
"RestrictColorPrint":{"1,2"}
"User":{1:"userA", 2:"userB"}
"Mobile":{1:"mobileA", 2:"mobileB", 3:"mobileC"}

FIG. 6B

"Printer":{1:"10.85.67.1", 2:"10.85.67.2", 3:"10.85.67.3"}
"PrinterGroup":{1:"1,2",2:"3"},
"DisablePrint":{"1"},
"RestrictColorPrint":{"1,2"},
"User":{1:"userA", 2:"userB"}
"Mobile":{1:"mobileA", 2:"mobileB", 3:"mobileC"}

FIG. 7A

| TYPE OF MPS | TARGET FILE | PORTION TO BE CHANGED | SETTING NAME | SETTING TYPE |
| --- | --- | --- | --- | --- |
| Solution A | /devices/main.json | Line 1 | "Printer" | Address |
| Solution A | /devices/main.json | Line 3 | "RestrictColorPrint" | Device Index |
| Solution A | /devices/main.json | Line 2 | "PrinterGroup" | |

FIG. 7B

| TYPE OF MPS | TARGET FILE | PORTION TO BE CHANGED | SETTING NAME | SETTING TYPE |
| --- | --- | --- | --- | --- |
| Solution A | /devices/main.json | Line 1 | "Printer" | Address |
| Solution A | /devices/main.json | Line 3 | "RestrictColorPrint" | Device Index |
| Solution A | /devices/main.json | Line 2 | "PrinterGroup" | Group Index |

FIG. 8

| TYPE OF MPS | TARGET FILE | PORTION TO BE CHANGED | SETTING NAME | SETTING TYPE |
|---|---|---|---|---|
| Solution A | /devices/main.json | Line 1 | "Printer" | Address |
| Solution A | /devices/main.json | Line 4 | "RestrictColorPrint" | Device Index |
| Solution A | /devices/main.json | Line 2 | "PrinterGroup" | Group Index |
| Solution A | /devices/main.json | Line 3 | "DisablePrint" | Group Index |

FIG. 9A

| IP ADDRESS | Device Index | Group Index |
|---|---|---|
| 10.85.67.1 | 1 | |
| 10.85.67.2 | 2 | |
| 10.85.67.3 | 3 | |

FIG. 9B

| IP ADDRESS | Device Index | Group Index |
|---|---|---|
| 10.85.67.1 | 1 | 1 |
| 10.85.67.2 | 2 | 1 |
| 10.85.67.3 | 3 | 2 |

FIG. 11

| PREPARED SETTING INFORMATION | ENVIRONMENTAL SETTING INFORMATION | STATUS |
|---|---|---|
| 172.27.241.1 | 10.85.67.1 | INSTALLED |
| 172.27.241.2 | 10.85.67.2 | INSTALLED |
| 172.27.241.3 | | NOT INSTALLED |
| 172.27.241.4 | | NOT INSTALLED |

FIG. 13A

"Printer":{1:"172.27.241.1",2:"172.27.241.2", 3:"172.27.241.3"}
"PrinterGroup":{1:"1,2",2:"3"},
"DisablePrint":{"1"},
"RestrictColorPrint":{"1,2,3"},
"User":{1:"userA", 2:"userB"}
"Mobile":{1:"mobileA", 2:"mobileB", 3:"mobileC"}

FIG. 13B

"Printer":{1:" 10.85.67.1",2:" 10.85.67.1",3:""}
"PrinterGroup":{1:"1,2",2:""},
"DisablePrint":{"1"},
"RestrictColorPrint":{"1,2"},
"User":{1:"userA", 2:"userB"}
"Mobile":{1:"mobileA", 2:"mobileB", 3:"mobileC"}

FIG. 14A

| TYPE OF MPS | TARGET FILE | PORTION TO BE CHANGED | SETTING NAME | SETTING TYPE |
|---|---|---|---|---|
| Solution A | /devices/main.json | Line 1 | "Printer" | Address |
| Solution A | /devices/main.json | Line 3 | "RestrictColorPrint" | Device Index |
| Solution A | /devices/main.json | Line 2 | "PrinterGroup" | Group Index |

FIG. 14B

| TYPE OF MPS | TARGET FILE | PORTION TO BE CHANGED | SETTING NAME | SETTING TYPE |
|---|---|---|---|---|
| Solution A | /devices/main.json | Line 1 | "Printer" | Address |
| Solution A | /devices/main.json | Line 3 | "RestrictColorPrint" | Device Index |
| Solution A | /devices/main.json | Line 2 | "PrinterGroup" | Device Index |

INFORMATION PROCESSING SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2023-049078 filed Mar. 24, 2023.

BACKGROUND

(i) Technical Field

The present disclosure relates to an information processing system, a non-transitory computer readable medium, and an information processing method.

(ii) Related Art

Japanese Unexamined Patent Application Publication No. 2017-156953 discloses an automatic installation system in which a management device and an information processing device communicate with each other, the management device includes an editing unit that acquires a setting information file set in another information processing device and edits the setting information file including a specific designatable item set by the information processing device, a generating unit that generates an instruction describing an automatic setting procedure to be executed by the information processing device from the setting information file edited by the editing unit, and a response unit that responds to an acquisition request received from the information processing device in response to execution of the instruction by the information processing device by transmitting a setting information file specified by the acquisition request, and the information processing device includes an execution unit that executes automatic installation processing by analyzing the instruction acquired from the management device, an acquisition unit that acquires a setting information file specified by the instruction analyzed by the execution unit from the management device, a detection unit that detects a specific item from the setting information file acquired by the acquisition unit, a setting unit that individually sets device information managed by the information processing device in the specific item detected by the detection unit, and a notifying unit that notifies the management device of end of the automatic installation processing executed by the execution unit, and the execution unit executes the automatic installation processing based on the setting information file by using the device information set by the setting unit.

Japanese Patent No. 6905111 discloses a system including a management device and an information processing device, in which the management device includes a generating unit that generates a setting information file including setting information used for installation processing in the information processing device and a transmitting unit that transmits the generated setting information file, the information processing device includes an execution unit that executes the installation processing by using the transmitted setting information file and a storage unit in which a condition as to whether or not each setting item of the setting information file is set in the information processing device is stored, and each setting item of the setting information file is set in the information processing device irrespective of the condition in a case where information for setting each setting item of the setting information file in the information processing device is included in the setting information file.

SUMMARY

A technique of preparing in advance setting information of a management device that manages a device to be managed in a virtual environment and reflecting the setting information in settings of the management device when the device to be managed and the management device are installed in an actual environment is known. However, the setting information also includes information on a setting item that depends on the actual environment in which the device to be managed and the management device are installed, that is, a setting item that cannot be prepared in advance. For example, information indicative of an installation place of the device to be managed such as an IP address is information that cannot be obtained unless the device to be managed is actually installed, and a setting item including the IP address cannot be correctly prepared in advance. If the setting information is reflected in setting of the management device as it is, there is a possibility that the management device includes a setting item that does not correspond to the actual environment.

Aspects of non-limiting embodiments of the present disclosure relate to an information processing system, a non-transitory computer readable medium, and an information processing method that can reflect setting corresponding to an actual environment in a management device even in a case where there is a setting item that cannot be prepared in advance.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor configured to: acquire prepared setting information, which is information on settings that is prepared in advance in an environment different from an actual environment and can be reflected in a management device that manages a device to be managed; acquire environmental setting information, which is information set in the device to be managed in the actual environment in which the device to be managed is actually installed; and update information on a setting item that depends on the actual environment in the prepared setting information by the environmental setting information and reflect the updated prepared setting information in settings of the management device.

BRIEF DESCRIPTION OF THE DRAWINGS

An exemplary embodiment of the present disclosure will be described in detail based on the following figures, wherein:

FIGS. 5A to 5C illustrate an example of environmental setting information according to the exemplary embodiment of the present disclosure;

FIGS. 6A and 6B illustrate an example of environmental setting information obtained by making an addition in a case where environmental setting information is already present according to the exemplary embodiment of the present disclosure;

FIGS. 7A and 7B illustrate an example of a setting information management table according to the exemplary embodiment of the present disclosure;

FIG. 8 illustrates another example of the setting information management table according to the exemplary embodiment of the present disclosure;

FIGS. 9A and 9B illustrate an example of the index management table according to the exemplary embodiment of the present disclosure;

FIG. 11 illustrates an example of a status management table according to the exemplary embodiment of the present disclosure;

FIGS. 13A and 13B are explanatory views for explaining update of information on settings according to the exemplary embodiment of the present disclosure; and FIGS. 14A and 14B are explanatory views for explaining verification performed to confirm that information on settings is correct according to the exemplary embodiment of the present disclosure.

DETAILED DESCRIPTION

Embodiment

Figure 1:
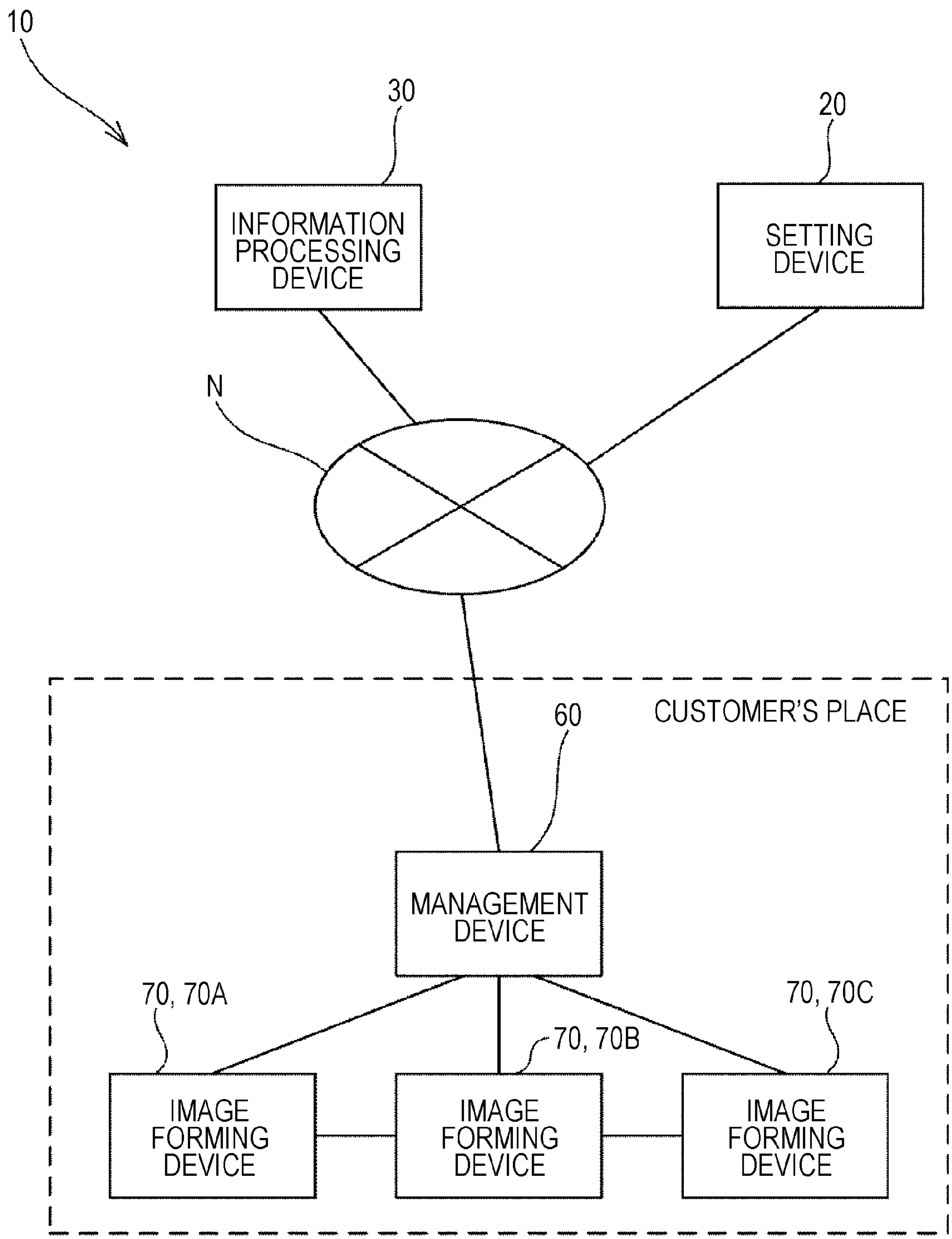
FIG. 1 is a schematic configuration diagram of an information processing system according to an exemplary embodiment of the present disclosure.

An exemplary embodiment of the present disclosure is described below with reference to the drawings. Note that identical or similar constituent elements and parts are given identical reference signs in the drawings. A dimensional ratio in the drawings is exaggerated for convenience of description and may be different from an actual ratio.

An example of an equipment system 10 according to the present exemplary embodiment is described with reference to FIG. 1.

FIG. 1 is a diagram illustrating an example of a schematic configuration of the equipment system 10 according to the present exemplary embodiment. As illustrated in FIG. 1, the equipment system 10 according to the present exemplary embodiment includes a setting device 20, an information processing device 30, a management device 60, and plural image forming devices 70 (an image forming device 70A, an image forming device 70B, an image forming device 70C . . . ). Furthermore, the equipment system 10 may include an input device (not illustrated) for inputting, in the management device 60, environmental setting information, which is information on settings of an image forming device 70 in an actual environment in which the image forming device 70 is actually installed. Note that the number of image forming devices 70 is not limited to the number illustrated in FIG. 1. In the following description, the image forming device 70A, the image forming device 70B, the image forming device 70C . . . are referred to simply as "image forming devices 70" in a case where they are not distinguished from one another.

The setting device 20, the information processing device 30, and the management device 60 are connected over a network N. The network N is, for example, a local area network (LAN), a wide area network (WAN), or the Internet. The image forming devices 70 may be connected to the network N without the management device 60 interposed therebetween.

The equipment system 10 according to the present exemplary embodiment is a system in which a business operator who sells or delivers the management device 60 or the image forming devices 70 prepares in advance, in the information processing device 30, settings of the image forming devices 70 to be installed at a customer's place, acquires settings of the installed management device 60, updates the information prepared in advance, and exports and reflects the updated information.

The setting device 20 is a device that prepares in advance and sets prepared setting information, which is information on settings of the image forming devices 70 to be installed at the customer's place in the equipment system 10. The prepared setting information set by the setting device 20 is transmitted to the information processing device 30. In the present exemplary embodiment, the setting device 20 is, for example, a personal computer (PC).

The management device 60 is a device that manages the image forming devices 70. The management includes management of setting, management of an optimum layout, management of an output cost, and security management of the image forming devices 70. In the present exemplary embodiment, the management device 60 is, for example, a device having a managed print service (MPS) function.

The image forming devices 70 are devices that are managed by the management device 60 and form an image on paper, which is a recording medium. In the present exemplary embodiment, the image forming devices 70 have various functions such as a print function, a copy function, a facsimile function, and a scanner function. In the present exemplary embodiment, the image forming devices 70 are an example of a device to be managed.

In an actual environment where the image forming devices 70 are actually installed at the customer's place, information on a setting item that depends on the actual environment is input to and set in the image forming devices 70. The information on the setting item that depends on the actual environment includes identification information for identifying the image forming devices 70 in the actual environment. The identification information includes location identification information for identifying locations of the image forming devices 70, individual identification information for individually identifying the image forming devices 70, and group identification information for identifying a group of the image forming devices 70. The identification information is information that is often unknown unless the image forming devices 70 are actually installed at the customer's place.

The information processing device 30 is an example of an information processing system. Note that the "system" in the present exemplary embodiment encompasses both one including plural devices and one including a single device. In the present exemplary embodiment, a device installed in a cloud environment is applied as the information processing device 30. However, the present exemplary embodiment is not limited to this. The information processing device 30 need not necessarily be installed in a cloud environment.

Figure 3:
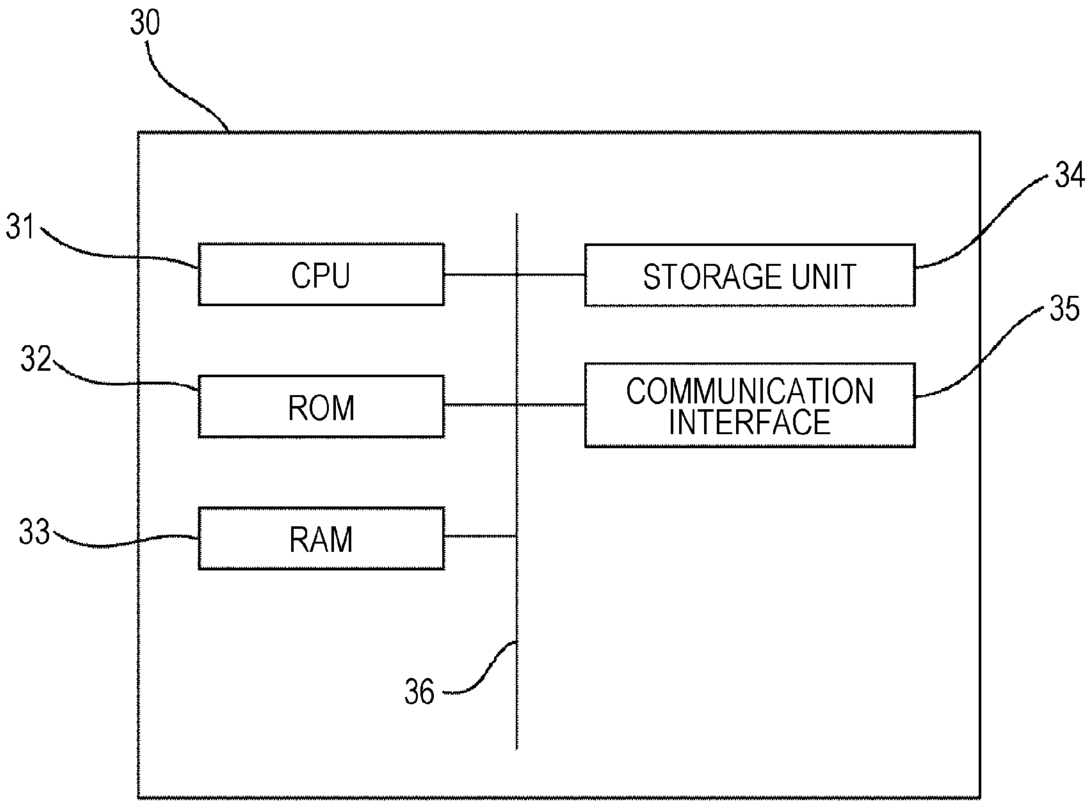
FIG. 3 is a schematic block diagram of the information processing device according to the exemplary embodiment of the present disclosure.

FIG. 3 is a block diagram illustrating a hardware configuration of the information processing device 30 according to the present exemplary embodiment.

As illustrated in FIG. 3, the information processing device 30 includes a central processing unit (CPU) 31, which is an example of a processor, a read only memory (ROM) 32, a random access memory (RAM) 33, a storage unit 34, and a communication interface 35. These constituent elements are communicably connected to one another over a bus 36.

The CPU 31 is a central processing unit, and executes various programs and controls each unit. That is, the CPU 31 reads out a program from the ROM 32 or the storage unit 34 and executes the program while using the RAM 33 as a working area. The CPU 31 controls the constituent elements and performs various kinds of arithmetic processing in accordance with the program stored in the ROM 32 or the storage unit 34. In the present exemplary embodiment, a program is stored in the ROM 32 or the storage unit 34.

In the ROM 32, various programs and various kinds of data are stored. The RAM 33 serves as a working area in which a program or data is temporarily stored. The storage unit 34 is a hard disk drive (HDD) or a solid state drive (SSD) and stores therein various programs including an operating system and various kinds of data.

In the present exemplary embodiment, various kinds of data such as prepared setting information set by the setting device 20 and environmental setting information acquired from a virtual management device 40, a virtual image forming device 41, or the management device 60 are stored in the storage unit 34 of the information processing device 30.

Figure 2:
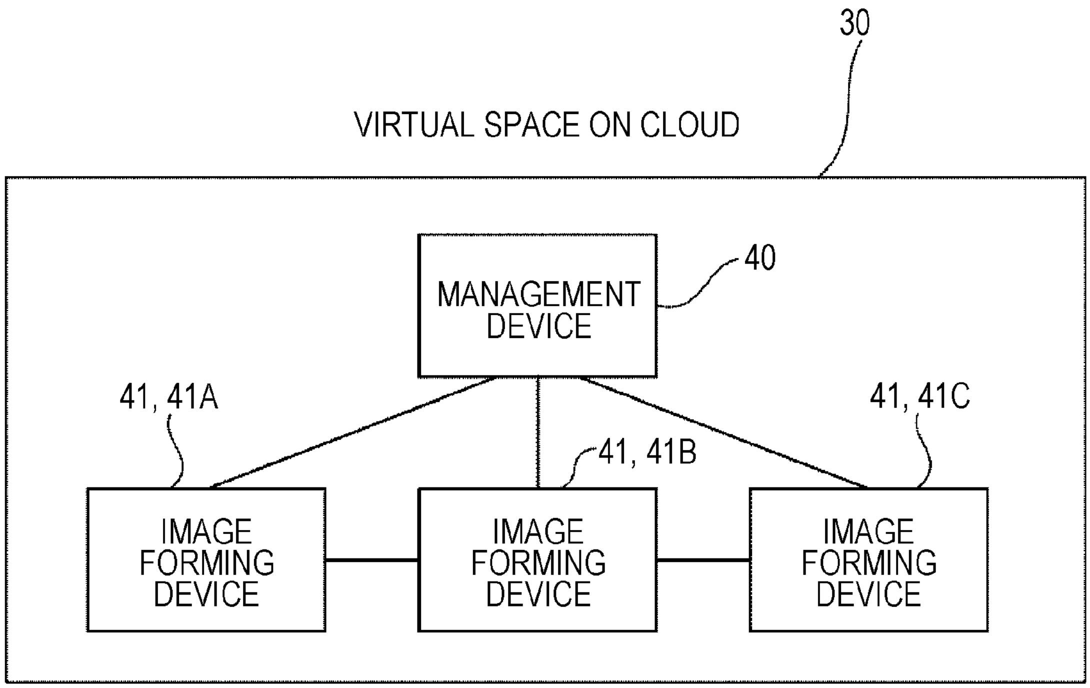
FIG. 2 is a schematic configuration diagram of virtual management device and image forming devices constructed in an information processing device according to the exemplary embodiment of the present disclosure.

The virtual management device 40 and the virtual image forming devices 41 are described below. As illustrated in FIG. 2, the virtual management device 40 and the virtual image forming devices 41 are a management device and image forming devices whose settings reflect prepared setting information that is information on settings prepared in advance in an environment on the information processing device 30 that reproduces an environment in which the management device 60 and the image forming devices 70 are installed. Prior evaluation concerning operation of the virtual management device 40 and the virtual image forming devices 41 is performed under such a virtual environment so that the prepared setting information can be reflected in the management device 60 and the image forming devices 70 that are actually installed.

The communication interface 35 is connected to the network N and is an interface for communication between the information processing device 30 and other devices such as the setting device 20 and the management device 60 and uses, for example, a standard such as Ethernet (Registered Trademark), FDDI, or Wi-Fi (Registered Trademark).

Next, operation of the information processing device 30 is described with reference to FIGS. 4 to 14. In the following description, it is assumed that prepared setting information has been set by using the setting device 20 and has been transmitted to the information processing device 30, the image forming devices 70 have been installed at the customer's place, and the environmental setting information has been set by an administrator or the like who performs setting.

Figure 4:
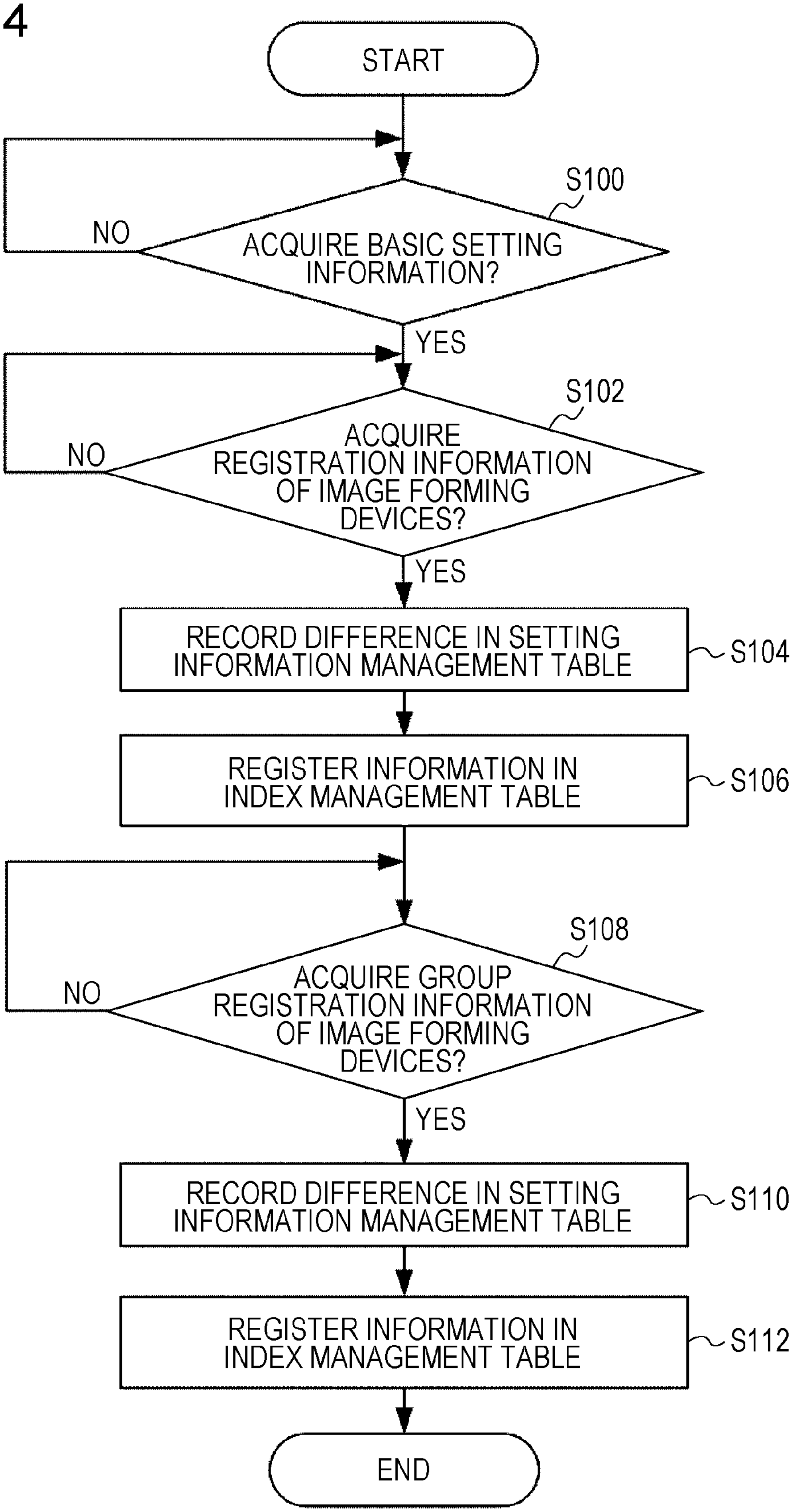
FIG. 4 is a flowchart illustrating an example of a flow of processing for generating a setting information management table and an index management table in a case where a management device is installed according to the exemplary embodiment of the present disclosure.

FIG. 4 is a flowchart illustrating an example of a flow of processing for generating a setting information management table and an index management table, which are examples of an environmental setting information management table, in a case where the management device 60 is installed.

First, in step S100, the CPU 31 acquires basic setting information included in environmental setting information from the management device 60. In the present exemplary embodiment, the basic setting information includes user information on a user (e.g., a user A) who uses the image forming devices 70. The basic setting information may be acquired upon entry of the basic setting information by a person in charge who installs the image forming devices 70 at the customer's place or may be acquired after all pieces of environmental setting information are input to the image forming devices 70. In a case where the basic setting information is not acquired, step S100 is performed again. On the other hand, in a case where the basic setting information has been acquired, next step S102 is performed. The CPU 31 may update the prepared setting information by using the basic setting information acquired in step S100 and register the updated prepared setting information in the virtual image forming devices 41 installed on the information processing device 30.

In step S102, the CPU 31 acquires registration information of the image forming devices 70 that is included in the environmental setting information. In the present exemplary embodiment, the registration information of the image forming devices 70 includes device indices, IP addresses, settings of color printing, and the like of the image forming devices 70. The registration information may be acquired upon entry of the registration information of the image forming devices 70 by a person in charge who installs the image forming devices 70 at the customer's place or may be acquired after all pieces of environmental setting information are input to the image forming devices 70. In a case where the registration information of the image forming devices 70 is not acquired, step S102 is performed again. On the other hand, in a case where the registration information of the image forming devices 70 have been acquired, next step S104 is performed. The CPU 31 may update the prepared setting information by using the registration information acquired in step S102 and register the updated prepared setting information in the virtual image forming devices 41 installed on the information processing device 30.

In step S104, the CPU 31 records, in the setting information management table (see FIGS. 7A and 7B), a difference between the basic setting information acquired in step S100 and the registration information of the image forming devices 70 acquired in step S102. In a case where the environmental setting information has been already acquired and the setting information management table is already present, the difference is added to the existing setting information management table (see FIG. 8). The case where the setting information management table is already present encompasses a case where the existing management device 60 is replaced with new one and a case where a version of software of the existing management device 60 is upgraded. Then, next step S106 is performed.

In step S106, the CPU 31 records, in the index management table (see FIGS. 9A and 9B), information based on the difference stored in the setting information management table in step S104. Then, next step S108 is performed.

In step S108, the CPU 31 acquires group registration information of the image forming devices 70 that is included in the environmental setting information. In the present exemplary embodiment, the group registration information of the image forming devices 70 includes a group index, which is information concerning grouping of the image forming devices 70. The group registration information may be acquired upon entry of the group registration information of the image forming devices 70 by a person in charge who installs the image forming devices 70 at the customer's place or may be acquired after all pieces of environmental setting information are input to the image forming devices 70. In a case where the group registration information of the image forming devices 70 is not acquired, step S108 is performed again. On the other hand, in a case where the group registration information of the image forming devices 70 has been acquired, next step S110 is performed. The CPU 31 may update the prepared setting information by using the group registration information acquired in step S108 and register the updated prepared setting information in the virtual image forming devices 41 installed on the information processing device 30.

In step S110, the CPU 31 records, in the setting information management table (see FIGS. 7A and 7B), a difference between the basic setting information acquired in step S100 and the registration information of the image forming devices 70 acquired in step S102 and the group registration information of the image forming devices 70 acquired in step S108. Then, next step S112 is performed.

In step S112, the CPU 31 records, in the index management table (see FIGS. 9A and 9B), information based on the difference stored in the setting information management table in step S110. Then, the processing is finished. That is, the CPU 31 acquires, for each predetermined setting, environmental setting information set in the image forming devices 70 in the actual environment in stages and stores the environmental setting information in the environmental setting information management table that manages a difference in each stage.

The environmental setting information is described with reference to FIGS. 5A to 5C and FIGS. 6A and 6B. FIGS. 5A to 5C illustrate an example of the environmental setting information. Information input to an item "Printer" includes an IP address for identifying a location of the image forming device 70. The IP address is an example of the location identification information. Information input to an item "RestrictColorPrint" includes a device index for individually identifying the image forming device 70. The device index is an example of the individual identification information. Information input to an item "PrinterGroup" includes a group index for identifying a group of the image forming device 70. The group index is an example of the group identification information.

FIG. 5A is an example of the environmental setting information (the basic setting information) acquired in step S100 of FIG. 4. Specifically, environmental setting information "1:"userA", 2:"userB"" is set in an item "User", and environmental setting information "1:"mobileA", 2:"mobileB", 3:"mobileC"" is set in an item "Mobile".

FIG. 5B illustrates an example of the environmental setting information (the registration information of the image forming devices 70) acquired in step S102 of FIG. 4. Specifically, environmental setting information "1:"10.85.67.1", 2:"10.85.67.2", 3:"10.85.67.3"" is set in the item "Printer", and the environmental setting information ""1,2"" is set in the item "RestrictColorPrint" in addition to the environmental setting information illustrated in FIG. 5A.

FIG. 5C illustrates an example of the environmental setting information (the group registration information of the image forming devices 70) acquired in step S108 of FIG. 4. Specifically, environmental setting information "1:"1,2",2: "3"" is set in the item "PrinterGroup" in addition to the environmental setting information illustrated in FIG. 5B.

FIG. 6A illustrates an example of existing environmental setting information. FIG. 6B illustrates an example of environmental setting information obtained by making an addition to FIG. 6A. Specifically, an item "DisablePrint" of FIG. 6B is added, and environmental setting information ""1"" is added to this item. This indicates that a printer "1" has been disabled.

The setting information management table is described with reference to FIGS. 7 and 8.

FIGS. 7A and 7B illustrate an example of the setting information management table. As illustrated in FIGS. 7A and 7B, a file name, a portion to be changed, a setting name, and a setting type that are to be changed are stored in the setting information management table.

FIG. 7A illustrates an example of the setting information management table in which the difference has been recorded in step S104 of FIG. 4. Specifically, "Line 1" of "PORTION TO BE CHANGED", ""Printer"" of "SETTING NAME", and "Address" of "SETTING TYPE" and "Line 3" of "PORTION TO BE CHANGED", ""RestrictColorPrint"" of "SETTING NAME", and "Device Index" of "SETTING TYPE" are stored as the difference. This difference is a difference between FIG. 5A and FIG. 5B.

FIG. 7B illustrates an example of the setting information management table in which the difference has been recorded in step S110 of FIG. 4. Specifically, "Line 2" of "PORTION TO BE CHANGED", ""PrinterGroup"" of "SETTING NAME", and "Group Index" of "SETTING TYPE" are stored as the difference. This difference is a difference between FIG. 5B and FIG. 5C.

FIG. 8 illustrates an example of the setting information management table obtained by making an addition to the existing setting information management table. Specifically, "Line 4" of "PORTION TO BE CHANGED" on the second row, "Solution A" of "TYPE OF MPS", "/devices/main.json" of "TARGET FILE", "Line 3" of "PORTION TO BE CHANGED", ""DisablePrint"" of "SETTING NAME", and "Group Index" of "SETTING TYPE" on the fourth row are stored as a difference. This difference is a difference between FIG. 6A and FIG. 6B.

The index management table is described with reference to FIGS. 9A and 9B.

FIGS. 9A and 9B illustrate an example of the index management table. As illustrated in FIGS. 9A and 9B, "IP address", "Device Index", and "Group Index" are stored in the index management table.

FIG. 9A illustrates the index management table registered in step S106 of FIG. 4. Specifically, IP addresses of three devices are recorded in "IP address", and "Device Index" is registered for each of the three devices. For example, "10.85.67.1" is registered in "IP address", and "1" is registered in "Device Index". FIG. 9A is registered on the basis of the environmental setting information of FIG. 5B.

FIG. 9B illustrates an example of the index management table registered in step S112 of FIG. 4. Specifically, "Group Index" is registered for each of the devices. For example, "1" is registered in "Group Index" for the image forming device 70 having an "IP address" of "10.85.67.1". FIG. 9B is registered on the basis of the environmental setting information of FIG. 5C.

Figure 10:
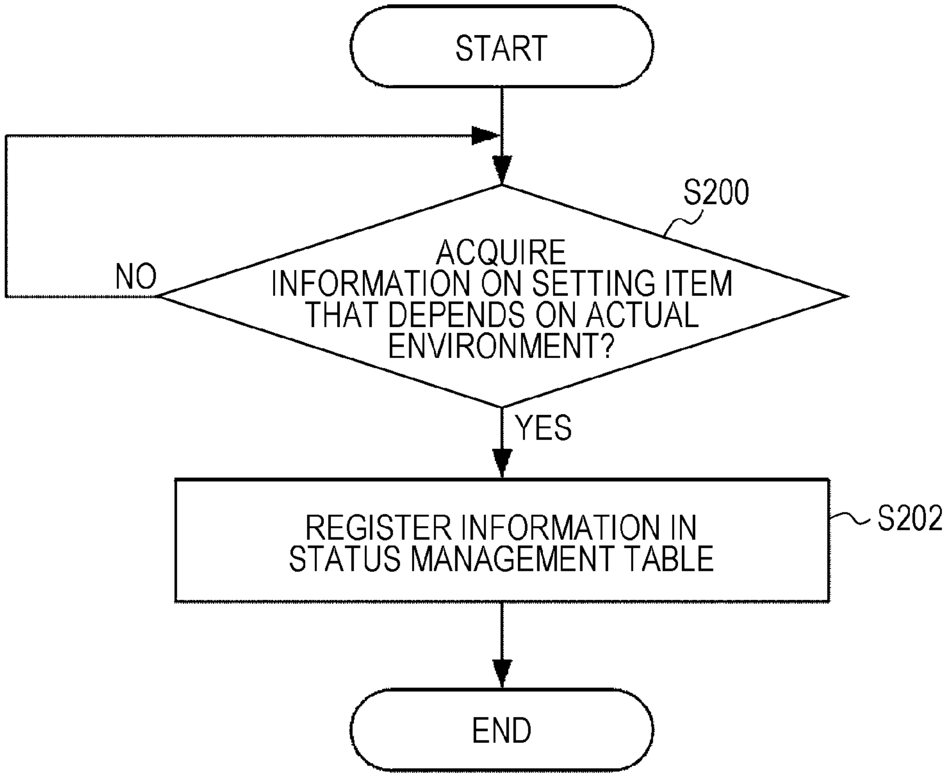
FIG. 10 is a flowchart illustrating an example of a flow of processing for generating a status management table when installation of an image forming device is completed and settings of the image forming device are reflected according to the exemplary embodiment of the present disclosure.

FIG. 10 is a flowchart illustrating an example of a flow of processing for generating a status management table, which is an example of an environmental setting information management table, when installation of an image forming device 70 is completed and settings of the image forming device 70 are reflected.

First, in step S200, the CPU 31 acquires information on a setting item that depends on the actual environment from the image forming device 70. The information on the setting item that depends on the actual environment includes identification information for identifying the image forming device 70 in the actual environment, as described above. The information on the setting item that depends on the actual environment is information unique to the device decided when the image forming device 70 is installed at the customer's place. The information on the setting item that depends on the actual environment is acquired upon entry of an instruction to reflect information on settings by a person in charge who sets the image forming device 70 at the customer's place. In a case where the information is not acquired, step S200 is performed again. On the other hand, in a case where the information has been acquired, next step S202 is performed.

In step S202, the CPU 31 registers the information in the status management table (see FIG. 11). Then, the processing is finished.

The status management table is described below with reference to FIG. 11.

FIG. 11 illustrates an example of the status management table. The status management table is a database in which a correspondence between the prepared setting information of the image forming devices 41 in a virtual environment that is different from the actual environment and generated on the information processing device 30 and the environmental setting information of the image forming devices 70 actually installed at the customer's place in the actual environment is registered. Specifically, a correspondence between an IP address set in the prepared setting information and an IP address set in the environmental setting information and a status as to whether or not an image forming device to which the IP address has been allocated has been installed are registered. For example, an image forming device 41A to which "172.27.241.1" has been allocated as an IP address in the prepared setting information, an IP address "10.85.67.1" allocated to the image forming device 70A corresponding to the image forming device 41A in the environmental setting information, and information indicative of "INSTALLED" as a status are registered. The status is information registered in order to rewrite settings of the management device 60 depending on whether or not an image forming device 70 has been installed since the plural image forming devices 70 are sometimes installed in stages.

Figure 12:
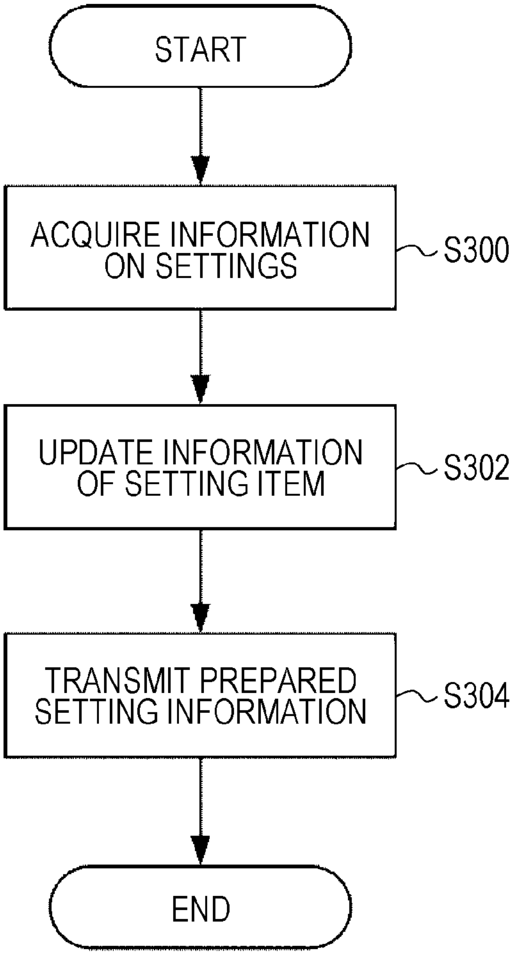
FIG. 12 is a flowchart illustrating an example of a flow of processing concerning update of setting information when installation of an image forming device is completed and settings of a virtual management device on the information processing device are exported according to the exemplary embodiment of the present disclosure.

FIG. 12 is a flowchart illustrating an example of a flow of processing concerning update of setting information performed by the CPU 31 when installation of the image forming devices 70 is completed and settings of the virtual management device 40 on the information processing device 30 are exported.

First, in step S300, the CPU 31 acquires information on settings from the prepared setting information, the setting information management table, the index management table, and the status management table. Then, next step S302 is performed.

In step S302, the CPU 31 updates the prepared setting information to information on settings based on the actual environment on the basis of the data acquired in step S300. Specifically, information on a setting item that depends on the actual environment in the environmental setting information, which is information set in the image forming devices 70 in the actual environment in which the image forming devices 70 are actually installed, is updated by the environmental setting information. Then, next step S304 is performed.

In step S304, the CPU 31 transmits the prepared setting information updated in step S302 to the management device 60. The management device 60 to which the prepared setting information has been transmitted performs setting reflecting the updated prepared setting information. Then, the processing is finished. Note that in a case where setting of the management device 60 cannot be performed by using the equipment system 10, setting is performed manually.

Update of information on settings is described below with reference to FIGS. 13A and 13B. For example, in a case where a setting type of the setting information management table is "Address" (see FIG. 7B), a value of the prepared setting information is replaced with a value of the environmental setting information by referring to the status management table (see FIG. 11), as illustrated in FIGS. 13A and 13B. Specifically, a value in a setting name ""Printer"" of a setting type "Address" is changed from "1:"172.27.241.1", 2:"172.27.241.2", 3:"172.27.241.3"" illustrated in FIG. 13A to "1:"10.85.67.1", 2:"10.85.67.1", 3:""" illustrated in FIG. 13B. As for a portion "3:"172.27.241.3"", a value "172.27.241.3" is deleted since the status in the status management table is "NOT INSTALLED".

In a case where a setting type of the setting information management table is "Device Index", a value of the prepared setting information is replaced with a value of the environmental setting information by referring to the index management table (see FIG. 9B) and the status management table (see FIG. 11), as illustrated in FIGS. 13A and 13B. Specifically, a value in ""RestrictColorPrint"" is changed from ""1,2,3"" illustrated in FIG. 13A to ""1,2"" illustrated in FIG. 13B in accordance with whether or not the target image forming devices 70 have been installed on the basis of the "Device Index" column of the index management table and an installation state in the status of the status management table.

In a case where a setting type of the setting information management table is "Group Index", a value of the prepared setting information is replaced with a value of the environmental setting information by referring to the index management table (see FIG. 9B) and the status management table (see FIG. 11), as illustrated in FIGS. 13A and 13B. Specifically, a value in ""PrinterGroup"" is changed from "1:"1,2",2:"3"" illustrated in FIG. 13A to "1:"1,2",2:""" illustrated in FIG. 13B in accordance with conditions set for the target image forming devices 70 on the basis of the "Group Index" column of the index management table and an installation state in the status of the status management table.

Note that whether the information on settings is correct may be verified before the updated prepared setting information is transmitted to the management device 60 in step S304. Specifically, a virtual management device that is a virtually constructed management device whose settings reflect the prepared setting information may be generated in an environment different from the actual environment, operation of the virtual management device may be checked, and in a case where the virtual management device does not operate, the operation may be checked again after replacing the individual identification information (Device Index) and the group identification information (GroupIndex) in the prepared setting information. The virtual management device may be identical to the virtual management device 40 or may be a different virtual management device.

For example, as illustrated in FIGS. 14A and 14B, first, information on settings "Group Index" (FIG. 14A) that is a setting type in the setting information management table is changed to the information on settings "Device Index" (FIG. 14B). The operation is checked after the change, and in a case where the virtual management device does not normally operate, the setting type "Device Index" is changed to "Group Index". In this way, first, the operation is checked after replacing the individual identification information and the group identification information with each other. This is because interpretation of "Device Index" and "Group Index" varies depending on a management device that is an MPS.

The present disclosure is not limited to the above embodiment, and can be modified and applied in various ways without departing from the spirit of the disclosure.

For example, although the setting information management table, the index management table, and the status management table are separate as an example of the environmental setting information management table in which environmental setting information is stored, this is not restrictive, and the environmental setting information may be stored in a single table.

Although an aspect in which a program is stored (installed) in advance in the ROM 32 or the storage unit 34 has been described in the above embodiment, this is not restrictive. The program may be offered by being recorded in a recording medium such as a compact disk read only memory (CD-ROM), a digital versatile disk read only memory (DVD-ROM), or a universal serial bus (USB) memory. Alternatively, the program may be downloaded from an external device over the network N.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

The following appendix is further disclosed regarding the above exemplary embodiment.

APPENDIX (((1)))

An information processing system including:

a processor configured to:

acquire prepared setting information, which is information on settings that is prepared in advance in an environment different from an actual environment and can be reflected in a management device that manages a device to be managed;

acquire environmental setting information, which is information set in the device to be managed in the actual environment in which the device to be managed is actually installed; and update information on a setting item that depends on the actual environment in the prepared setting information by the environmental setting information and reflect the updated prepared setting information in settings of the management device.

(((2)))

The information processing system according to (((1))), in which:

the processor is configured to acquire, for each predetermined setting, the environmental setting information set in the device to be managed in the actual environment in stages.

(((3)))

The information processing system according to (((2))), in which:

the processor is configured to store the acquired environmental setting information in an environmental setting information management table that manages the environmental setting information for each of the stages.

(((4)))

The information processing system according to (((3))), in which:

the processor is configured to update the information on the setting item that depends on the actual environment by the environmental setting information by referring to the environmental setting information management table when reflecting the prepared setting information in the settings of the management device.

(((5)))

The information processing system according to any one of (((1))) to (((4))), in which:

the information on the setting item that depends on the actual environment includes identification information for identifying the device to be managed in the actual environment.

(((6)))

The information processing system according to (((5))), in which:

the identification information includes location identification information for identifying a location of the device to be managed.

(((7)))

The information processing system according to (((5))), in which:

the identification information includes individual identification information for individually identifying the device to be managed and group identification information for identifying a group of the device to be managed.

(((8)))

The information processing system according to (((7))), in which:

the processor is configured to:

generate a virtual management device, which is the management device virtually constructed whose settings reflect the prepared setting information, in an environment different from the actual environment and check operation of the virtual management device; and in a case where the virtual management device does not operate, check the operation again after replacing the individual identification information and the group identification information in the prepared setting information with each other.

(((9)))

A program causing a computer to execute a process, the process including:

acquiring prepared setting information, which is information on settings that is prepared in advance in an environment different from an actual environment and can be reflected in a management device that manages a device to be managed;

acquiring environmental setting information, which is information set in the device to be managed in the actual environment in which the device to be managed is actually installed; and updating information on a setting item that depends on the actual environment in the prepared setting information by the environmental setting information and reflect the updated prepared setting information in settings of the management device.

What is claimed is:

1. An information processing system comprising:

a processor configured to:

acquire prepared setting information, which is information on settings that is prepared in advance in a virtual environment different from an actual environment and reflected in a virtual management device configured to virtually reproduce a management device that manages a device to be managed;

acquire environmental setting information, which is information set in the device to be managed in the actual environment in which the device to be managed is actually installed;

update the prepared setting information by replacing, with identification information included in the environmental setting information, information on a setting item that depends on the actual environment, and transmit the updated prepared setting information to the management device such that the management device reflects the updated prepared setting information in settings of the management device.

2. The information processing system according to claim 1, wherein:

the processor is configured to acquire, for each predetermined setting, the environmental setting information set in the device to be managed in the actual environment in stages.

3. The information processing system according to claim 2, wherein:

the processor is configured to store the acquired environmental setting information in an environmental setting information management table that manages the environmental setting information for each of the stages.

4. The information processing system according to claim 3, wherein:

the processor is configured to update the information on the setting item that depends on the actual environment by the environmental setting information by referring to the environmental setting information management table when reflecting the prepared setting information in the settings of the management device.

5. The information processing system according to claim 1, wherein:

the information on the setting item that depends on the actual environment includes the identification information for identifying the device to be managed in the actual environment.

6. The information processing system according to claim 5, wherein:

the identification information includes location identification information for identifying a location of the device to be managed.

7. The information processing system according to claim 5, wherein:

the identification information includes individual identification information for individually identifying the device to be managed and group identification information for identifying a group of the device to be managed.

8. The information processing system according to claim 7, wherein:

the processor is configured to:

generate the virtual management device, which is the management device virtually constructed whose settings reflect the prepared setting information, in the virtual environment different from the actual environment and check operation of the virtual management device; and in a case where the virtual management device does not operate, check the operation again after replacing the individual identification information and the group identification information in the prepared setting information with each other.

9. A non-transitory computer readable medium storing a program causing a computer to execute a process, the process comprising:

acquiring prepared setting information, which is information on settings that is prepared in advance in a virtual environment different from an actual environment and reflected in a virtual management device configured to virtually reproduce a management device that manages a device to be managed;

acquiring environmental setting information, which is information set in the device to be managed in the actual environment in which the device to be managed is actually installed;

updating the prepared setting information by replacing, with identification information included in the environmental setting information, information on a setting item that depends on the actual environment, and transmitting the updated prepared setting information to the management device such that the management device reflects the updated prepared setting information in settings of the management device.

10. An information processing method comprising:

acquiring prepared setting information, which is information on settings that is prepared in advance in a virtual environment different from an actual environment and reflected in a virtual management device configured to virtually reproduce a management device that manages a device to be managed;

acquiring environmental setting information, which is information set in the device to be managed in the actual environment in which the device to be managed is actually installed;

updating the prepared setting information by replacing, with identification information included in the environmental setting information, information on a setting item that depends on the actual environment, and transmitting the updated prepared setting information to the management device such that the management device reflects the updated prepared setting information in settings of the management device.

* * * * *